United States Patent
Gochenour et al.

[11] Patent Number: 5,373,927
[45] Date of Patent: Dec. 20, 1994

[54] CLUTCH RELEASE ASSEMBLY

[75] Inventors: Daniel V. Gochenour, Auburn, Ind.; Matthew R. Arend, Hicksville, Ohio; James K. Tarlton, Sr., Auburn, Ind.

[73] Assignee: Dana Corporation, Toledo, Ohio

[21] Appl. No.: 114,563

[22] Filed: Aug. 31, 1993

[51] Int. Cl.$^5$ .................. F16D 13/56; F16D 23/14
[52] U.S. Cl. .................. 192/70.3; 192/89.26; 192/98; 192/99 A
[58] Field of Search .......... 192/70.29, 70.3, 99 A, 192/70.27, 89.26, 98

[56] References Cited

U.S. PATENT DOCUMENTS

| | | |
|---|---|---|
| 1,134,699 | 4/1915 | Scofield . |
| 1,279,243 | 9/1918 | Bruce et al. . |
| 1,294,800 | 2/1919 | Hawley . |
| 1,333,440 | 3/1920 | Ollard . |
| 1,470,268 | 10/1923 | Lauth . |
| 1,481,976 | 1/1924 | Bendix . |
| 1,489,423 | 4/1924 | Brown et al. . |
| 1,490,967 | 4/1924 | Denneen et al. . |
| 1,508,747 | 9/1924 | Dooley . |
| 1,538,976 | 5/1925 | Denneen et al. . |
| 1,611,173 | 12/1926 | Eos et al. . |
| 1,789,056 | 1/1931 | Valletta . |
| 1,797,515 | 3/1931 | Schoenrock . |
| 1,928,084 | 9/1933 | Worner . |
| 1,935,581 | 11/1933 | Snow, Jr. . |
| 1,973,199 | 9/1934 | Conway . |
| 1,983,885 | 12/1934 | Spase . |
| 2,002,841 | 5/1935 | Tatter . |
| 2,018,834 | 10/1935 | Church . |
| 2,020,637 | 12/1935 | Fawick . |
| 2,057,742 | 10/1936 | Russell . |
| 2,064,450 | 12/1936 | Spase . |
| 2,077,709 | 4/1937 | Pearmain . |
| 2,107,954 | 2/1938 | Morton et al. . |
| 2,171,829 | 9/1939 | Haupt . |
| 2,280,355 | 4/1942 | Spase et al. . |
| 2,683,513 | 7/1954 | Schoenrock . |
| 2,703,164 | 3/1955 | Binder . |
| 3,176,814 | 4/1965 | Sink . |
| 3,212,612 | 10/1965 | Sink . |
| 3,376,964 | 4/1968 | Root . |
| 3,394,788 | 7/1968 | Sink ................ 192/99 A X |
| 3,424,288 | 1/1969 | Sink . |
| 3,478,853 | 11/1969 | Kraeplin . |
| 3,741,361 | 6/1973 | Brandenstein . |
| 3,752,286 | 8/1973 | Sink . |
| 3,754,628 | 8/1973 | Hildebrand . |
| 3,871,500 | 3/1975 | Linn et al. . |
| 3,902,334 | 9/1975 | Ryan . |
| 3,912,058 | 10/1975 | Parkins . |
| 3,948,371 | 4/1976 | Lonne . |
| 4,034,836 | 7/1977 | Sink et al. . |
| 4,099,604 | 7/1978 | Higgerson . |
| 4,117,917 | 10/1978 | Ladin et al. . |
| 4,141,441 | 2/1979 | Fukatani . |
| 4,157,749 | 6/1979 | Sink et al. . |
| 4,159,754 | 7/1979 | Airheart et al. . |
| 4,194,610 | 3/1980 | Miller . |

(List continued on next page.)

FOREIGN PATENT DOCUMENTS 2187241  9/1987  United Kingdom .

*Primary Examiner*—Richard M. Lorence
*Attorney, Agent, or Firm*—Dykema Gossett

[57] ABSTRACT

A clutch engaging assembly includes a sleeve member positioned circumferentially about a drive shaft, wherein the sleeve member includes a radially outwardly extending circumferential flange. A spring collector is positioned circumferentially about the sleeve member by a plurality of radially extending and angled coil springs positioned between the spring collector and the clutch cover. The angled springs, along with a plurality of axially extending spring members, urge the spring collector towards the flange of the sleeve member. A clearance is maintained between the sleeve member and the spring collector. The spring collector is not fixed to any member of the clutch, and is permitted limited radial movement about the sleeve member.

12 Claims, 2 Drawing Sheets

U.S. PATENT DOCUMENTS

| | | | |
|---|---|---|---|
| 4,225,028 | 9/1980 | Wishart . | |
| 4,228,883 | 10/1980 | Palmer . | |
| 4,231,456 | 11/1980 | Nakane et al. . | |
| 4,258,836 | 3/1981 | Miller . | |
| 4,305,492 | 12/1981 | Mori et al. . | |
| 4,327,823 | 5/1982 | Muller et al. . | |
| 4,351,419 | 9/1982 | Garrett et al. . | |
| 4,437,555 | 3/1984 | Tomm et al. . | |
| 4,534,458 | 8/1985 | Ladin . | |
| 3,548,989 | 12/1970 | Root . | |
| 4,591,039 | 5/1986 | Lutz et al. . | |
| 4,640,400 | 2/1987 | Nakane et al. . | |
| 4,702,361 | 10/1987 | Banks . | |
| 4,720,002 | 1/1988 | Kitano et al. . | |
| 4,732,251 | 3/1988 | Tipton . | |
| 4,754,860 | 7/1988 | Fukutake . | |
| 4,760,906 | 8/1988 | Flotow et al. | 192/70.3 X |
| 4,776,444 | 10/1988 | Worner et al. . | |
| 4,779,713 | 10/1988 | Tomala et al. . | |
| 4,784,245 | 11/1988 | Fabbro et al. . | |
| 4,784,249 | 11/1988 | Harrison . | |
| 4,844,226 | 7/1989 | Taketani . | |
| 4,848,550 | 7/1989 | Kitano et al. . | |
| 4,856,634 | 8/1989 | Kitano et al. . | |
| 4,890,708 | 1/1990 | Kitano et al. . | |
| 4,892,004 | 1/1990 | Segura . | |
| 4,895,235 | 1/1990 | Nishimura et al. . | |
| 4,936,432 | 6/1990 | Flotow | 192/70.3 X |
| 4,958,714 | 9/1990 | Cooke et al. . | |
| 4,982,825 | 1/1991 | Sekalla . | |
| 4,993,532 | 2/1991 | Weiss et al. . | |
| 5,018,613 | 5/1991 | Nagano . | |
| 5,029,687 | 7/1991 | Asada et al. . | |
| 5,069,322 | 12/1991 | Mizukami et al. . | |
| 5,123,512 | 6/1992 | Nemoto et al. . | |
| 5,139,126 | 8/1992 | Perez et al. . | |
| 5,230,413 | 7/1993 | Lewis et al. | 192/70.3 X |

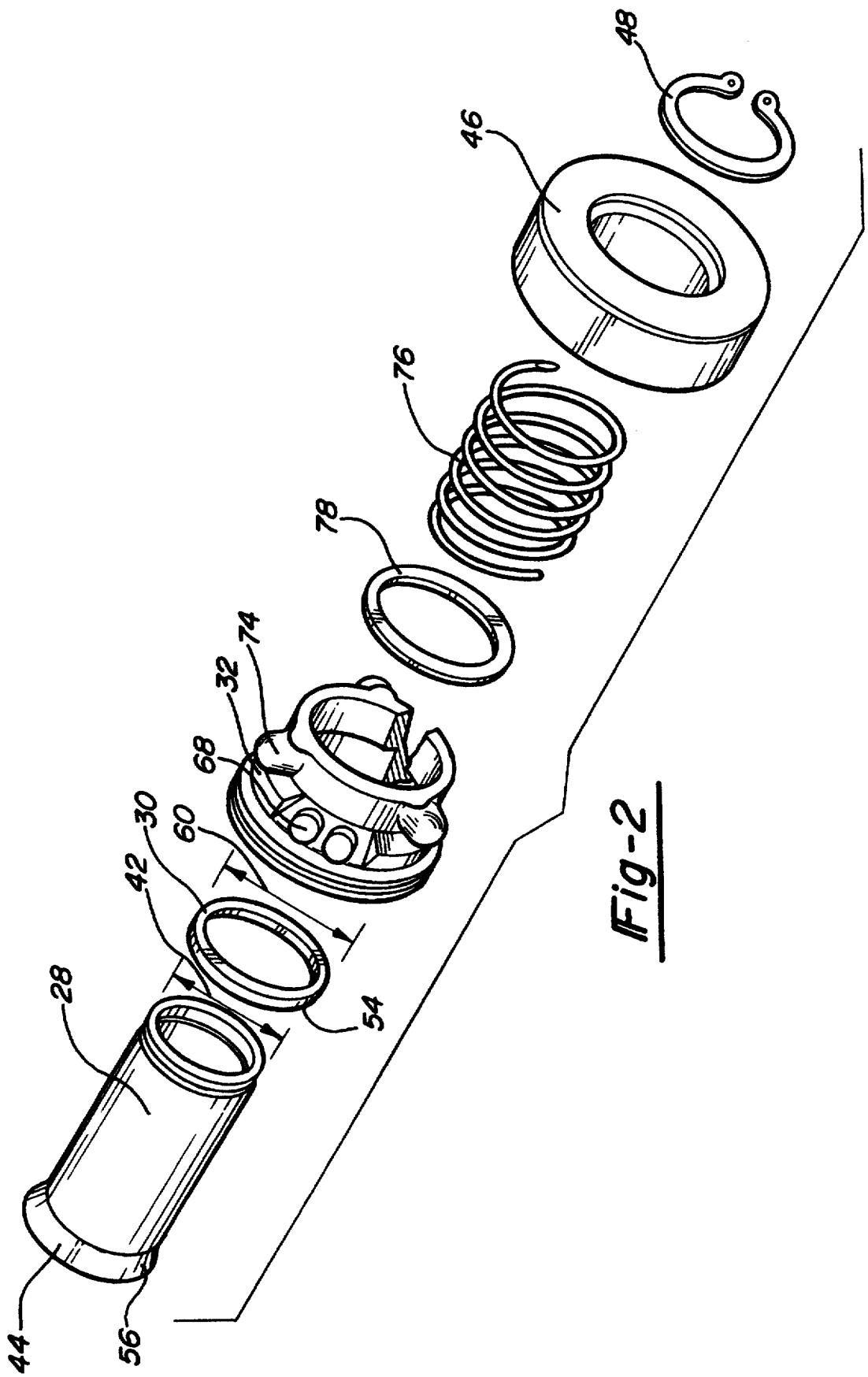

CLUTCH RELEASE ASSEMBLY

FIELD OF THE INVENTION

This invention generally relates to a pull-type clutch and, more particularly, to a release assembly used to engage and disengage a clutch.

BACKGROUND OF THE INVENTION

Clutches that utilize multi-piece release assemblies to provide mechanical linkage for engagement and disengagement of driven discs and pressure plates are well-known. Such a release assembly typically includes a sleeve member extending along an input drive shaft, and a retainer member positioned circumferentially about the sleeve member. A clutch engaging member, typically a lever, cooperates wish the retainer member to apply force to a pressure plate. A spring urges the retainer member along the axial direction of the sleeve member to move the pressure plate to a clutch-engaged position. The retainer member is pulled against the force of the spring to disengage the pressure plate from the driven disc.

In a prior art design, the retainer member is rotatably mounted to another clutch member, typically a clutch cover or a sleeve member. Due to the large contact area existing between the retainer and the sleeve members, the members are subject to wear. This in time results in undesirable operation of the clutch. Furthermore, due to the large contact area, the components of the release assembly must be manufactured to tight tolerances.

It is, therefore, a goal of the present invention to provide a release assembly in which wear is reduced on the release assembly members by providing a clearance between the retainer and the sleeve members.

SUMMARY OF THE INVENTION

In accordance with the present invention, an improved release assembly for a pull-type clutch is provided. The clutch release assembly includes a sleeve which extends along and about an output drive shaft. The sleeve includes a radially outwardly extending circumferential flange at one end. Adjacent to the flange, a spring collector is positioned circumferentially about the sleeve and dimensioned to provide a radial clearance from the sleeve. A thrust ring is positioned between the flange and the spring collector. A clutch engagement spring system is provided between a clutch cover and the spring collector to position the spring collector tightly against the circumferential flange of the sleeve. The spring system allows for limited radial movement of the spring collector in between the sleeve and the clutch cover. Levers extend into a peripheral groove on the spring collector which pivot against an annular shoulder on a pressure plate resulting in movement of the pressure plate to engage or disengage the clutch.

These and other features of the present invention can be best understood from the following specification and drawings, of which the following is a brief description.

BRIEF DESCRIPTION OF THE DRAWINGS

FIG. 2 is an exploded isometric view of a portion of the clutch release assembly.

DETAILED DESCRIPTION OF THE PREFERRED EMBODIMENT

Figure 1:
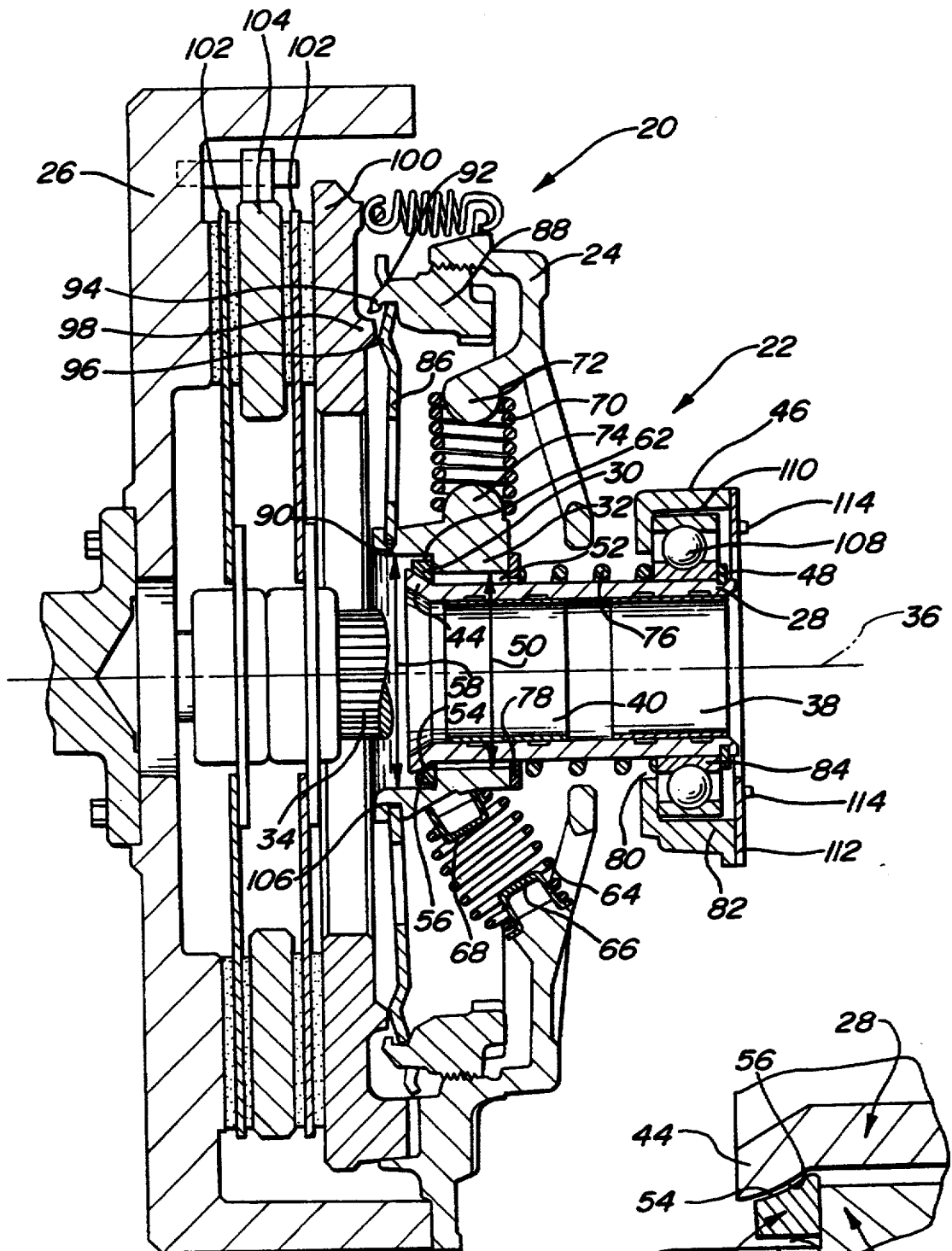
FIG. 1 is a partial cross-sectional view of a pull-type clutch having a release assembly according to the present invention.

Referring now to FIG. 1 which illustrates a pull-type clutch 20 including a novel clutch release assembly 22 of the present invention, clutch 20 includes a clutch cover 24, which is adapted to be secured to a flywheel 26. Clutch release assembly 22 includes a sleeve 28, a thrust ring 30, and a spring collector 32 which is used in place of a conventional retainer.

Sleeve 28 is positioned circumferentially about an output drive shaft 34, and extends along drive axis 36. A first and second bushing 38 and 40 are secured within sleeve 28 and are radially interposed between drive shaft 34 and sleeve 28. The use of two bushings 38 and 40 assists in the centering of sleeve 28, and reduces axial sliding of the bushings when clutch 20 is in the engaged or released position.

Figure 1A:
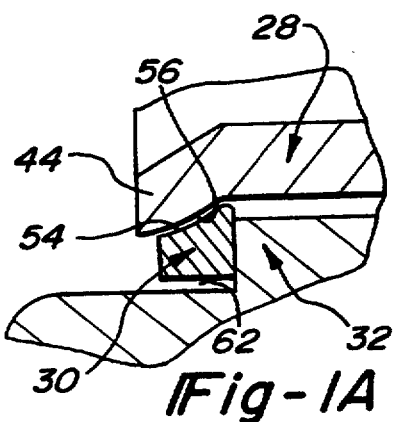
FIG. 1A is a fragmented cross-sectional view of the clutch shown in FIG. 1.

Referring now to FIG. 2, one end of sleeve 28 is flared radially outwardly to define a circumferential flange 44. A pull assembly 46 is carried by sleeve 28, and secured at one end of sleeve 28 by a snap ring 48. At the opposite end of sleeve 28, spring collector 32 is positioned circumferentially about sleeve 28. As shown in FIG. 1, inner diameter 50 of spring collector 32 is greater than the outer diameter 42 of sleeve 28 to provide a radial clearance 52. Thrust ring 30 is disposed between flange 44 and spring collector 32. Thrust ring 30 receives a thrust force from flange 44 which is transmitted to spring collector 32, thus eliminating contact between spring collector 32 and sleeve 28. Further, thrust ring 30 and flange 44 each include a corresponding contact surface 54 and 56, which are curved. FIG. 1A more clearly shows the curved contact surface 54 of thrust ring 30, and corresponding curved contact surface 56 of flange 44. Curved surfaces 54 and 56 are uniform along the entire circumference to provide a convex and corresponding concave shape to assist in positioning thrust ring 30 on flange 44. A second inner diameter 58 of spring collector 32 is greater than the outer diameter 60 of thrust ring 30 providing a radial clearance 62 between thrust ring 30 and spring collector 32. The purpose and advantage gained by clearance 62 will be described below.

A plurality of compression springs 64 (shown in the lower half of FIG. 1) position spring collector 32 circumferentially about sleeve 28. Compression springs 64 are circumferentially spaced and are compressed between clutch cover 24 and a ramped surface on spring collector 32. The radially outer end of each spring is piloted on a seat 66 on clutch cover 24 which is slanted such that its axis extends radially inwardly and forwardly towards a substantially coaxial seat 68 on spring collector 32. The seats 66 and 68 pilot the opposed ends of compression springs 64, to urge spring collector 32 to the left, or engaged position.

A plurality of assistor springs 70 (shown in the upper half of FIG. 1) are disposed circumferentially about spring collector 32 between adjacent compression springs 64. Each assistor spring 70 is piloted on a seat 72 of clutch cover 24 towards a substantially coaxial seat 74 on spring collector 32. Assistor springs 70 are coiled and compressed, with their axis disposed radially with respect to clutch cover 24 and spring collector 32 when the clutch is in the engaged position. As shown, compression springs 64 and assistor springs 70 are coil springs.

A positioning spring 76 extends along the drive axis 36 about sleeve 28. A washer 78 is disposed between positioning spring 76 and spring collector 32. Positioning spring 76 assists in urging spring collector 32 towards the left, or against thrust ring 30.

Positioning spring 76 extends through an opening 80 in the housing 82 of pull assembly 46 to contact an inner race 84. During operation of the clutch, contaminants may enter pull assembly 46 through opening 80. The positioning spring is, therefore, wrapped in a helix such that the drive shaft rotation, along with the direction of the helix, aid in keeping contaminants out of the pull assembly.

To engage the clutch, a plurality of clutch levers 86 are interposed between the spring collector 32 and a clutch adjusting ring 88. Adjusting ring 88 is threaded to clutch cover 24. The radially inner end of each lever 86 is received in a peripheral groove 90 formed in spring collector 32. The radially outer end of each lever 86 has an opening 92 which receives a leftwardly projecting pivot 94 formed on the left face of adjusting ring 88.

A leftwardly extending projection 96 is intermediate the ends of levers 86. Projection 96 pivotally and pressingly engages an annular shoulder 98 formed on the right side of a pressure plate 100. Thus, leftward movement of spring collector 32 causes levers 86 to force pressure plate 100 to engage one of a pair of driven discs 102 thereby engaging the clutch. A driven plate 104 is spaced intermediate the pair of driven discs 102.

The illustrated clutch is for heavy duty operations, which subjects the release assembly 22 to significant forces when engaging or releasing the clutch. For example, due to the arrangement of the two driven disc 102, torque loading may be imposed on driven plate 104 through non-uniform rotation of flywheel, driven discs 102, and/or driven plate 104. The torque loading can produce vibratory motion on driven plate 104 adding to the stresses imposed on the components of release assembly 22.

A feature of the invention is a spring collector that is essentially "free floating" within clutch cover 24 about sleeve 28. Spring collector 32 is not splined to sleeve 28, as in some prior art arrangements, nor is the spring collector fixed to any other member within clutch 20. Spring collector 32 is positioned only by compression springs 64, assistor springs 70, and levers 86. Further, compression springs 64 and assistor springs 70 act on the spring collector 32 to constantly center the spring collector 32 about the release sleeve 28. Due to this arrangement, spring collector 32 is permitted some amount of radial and axial movement within clutch cover 24.

The "free floating" spring collector also assists in developing an equal clamp load on each of the levers 86. In some prior art arrangements, one or more levers may be loose causing it to vibrate, or "chatter," within the clutch cover 24. The disclosed arrangement of the spring collector 32 and levers 86 provides a uniform pressure on each lever 86, increasing the effective load provided by compression springs 64 against pressure plate 100, thus reducing vibration of the levers.

The radial clearances 52 and 62 between spring collector 32 and sleeve 28, and spring collector 32 and thrust ring 30, respectively, allow for a reduction in tangential forces acting on bushings 38 and 40 during clutch operation. By reducing wear on the bushings, a smooth operation of the release assembly over an extended period of time is achieved. In addition, the clutch release assembly with clearances 52 and 62 permits a greater range of manufacturing tolerances without affecting clutch operation.

In a further feature of the invention, peripheral groove 90 is dimensioned to allow for limited movement of spring collector 32 relative to levers 86. The axial dimensions of groove 90 permit the spring collector to be slightly out of radial position due to uneven spring pressures. However, the nominal clearance 106 between the inner end of lever 86 and spring collector is less than clearance 62 between the spring collector 32 and thrust ring 30 when the clutch is in the disengaged position. Alternatively, clearance 106 is less than clearance 52 between spring collector 32 and sleeve 28 in the disengaged position. Levers 86 are rigid which limits the extent of movement of spring collector 32. Levers 86 thereby prevent spring collector 32 from contacting sleeve 28. With either arrangement, spring collector 32 is prevented from applying a tangential force on sleeve 28, which in turn applies a force on bushing 38 and 40. Several advantages are achieved by reducing forces on bushings 38 and 40, such as reduced wear, reduced frictional drag between the bushings and drive shaft 34, and reduced heat build up in release assembly components.

In the preferred embodiment, the nominal clearance 106 between the levers and spring collector is 0.027" (0.68 mm) and the nominal clearance 62 between the thrust ring and spring collector is 0.085" (2.16 mm) when the spring collector is pulled to the right in a disengaged position. The spring collector, thrust ring, sleeve and levers are formed of metal. Pull assembly 46 includes a plurality of release bearings 108 and a steel bearing spring 110. A cast bearing cover 112 is secured to housing 82 by rivets 114.

Additional advantages are also made possible by the novel clutch release assembly 22. Operator control is increased due to self-adjusting of the spring collector relative to the sleeve when engaging the clutch. While engaged or disengaged, noise is reduced by reducing the vibration of levers 86. Excessive movement of sleeve 28 relative to pull assembly 46 is reduced because some movement is absorbed by the "free floating" spring collector 32. Further, clutch release assembly 22 is easier to assemble and to install within clutch 20 because of clearances provided between the components.

A preferred embodiment of the present invention has been disclosed. A worker of ordinary skill in the art will recognize, however, that modifications of the disclosed embodiment will fall within the scope of this invention. For that reason, the following claims should be studied to determine the true scope and content of this invention.

What is claimed is:

1. A clutch release assembly for a friction clutch equipped with a drive shaft and a clutch cover, said assembly comprising:

a sleeve member adapted to be positioned circumferentially about the drive shaft, said sleeve member including a flange extending radially outwardly therefrom;

a spring collector member positioned circumferentially about said sleeve member, said spring collector being movable axially and rotationally with respect to said sleeve member;

spring means adapted to be interposed between the clutch cover and said spring collector member, said spring collector member adapted to have limited radial movement with respect to the clutch cover and said sleeve member, said spring means urging said spring collector member axially towards said flange of said sleeve member;

a clutch engaging means carried by said spring collector member; and said spring collector member having an inner diameter greater than the outer diameter of said sleeve member such that a radial clearance is maintained between said spring collector member and said sleeve member, wherein said spring collector is movable radially with respect to said sleeve member.

2. The assembly of claim 1, wherein a thrust ring is disposed between said spring collector member and said flange of said sleeve member.

3. The assembly of claim 1, wherein a positioning spring member extends along the axial direction of said sleeve member, said positioning spring member being interposed between said spring collector and a release mechanism for said sleeve member, said positioning spring urging said spring collector member towards said flange of said sleeve member.

4. The assembly of claim 1, wherein said spring means is a plurality of coil springs disposed at an oblique angle relative to a rotational axis of said sleeve member.

5. The assembly of claim 1, wherein said clutch engaging means is a plurality of rigid levers, and a first radial clearance is provided between said plurality of rigid levers and said spring collector member, and a second radial clearance is provided between said spring collector member and said sleeve member, said first radial clearance being less than said second radial clearance such that said spring collector member is prevented from contacting said sleeve member.

6. The assembly of claim 2, wherein said clutch engaging means is a plurality of rigid levers, and a first radial clearance is provided between said plurality of rigid levers and said spring collector member, and a second radial clearance is provided between said spring collector member and said thrust ring, said first radial clearance being less than said second radial clearance such that said spring collector member is prevented from contacting said sleeve member.

7. The assembly of claim 2, wherein said thrust ring and said flange of said sleeve member each having a corresponding contact surface, said contact surfaces being curved.

8. A clutch transmitting rotation to an output drive shaft, said clutch comprising:

a driven disc received on said output drive shaft;
a pressure plate adjacent said driven disc;
a clutch cover extending about said output drive shaft;
a sleeve member positioned circumferentially about said output drive shaft, said sleeve member having first and second ends, said first end operatively engaging a pull assembly, said second end including a radially outwardly extending circumferential flange;

a plurality of coil springs, said clutch cover having a plurality of coil spring seats;

a spring collector member positioned circumferentially about said sleeve member, said sleeve member having an outer diameter of a first dimension, said spring collector member having an inner diameter of a second dimension, said second dimension being greater that said first dimension, said spring collector member having a plurality of coil spring seats, said plurality of coil springs extending radially between said spring collector member and said clutch cover, each of said plurality of coil springs being seated upon corresponding seats of said clutch cover and said spring collector member, said plurality of coil springs maintaining a radial clearance between said spring collector member and said sleeve member that said spring collector member is provided with limited radial movement with respect to said sleeve member, at least some of said coil springs being angled to urge said spring collector member towards said circumferential flange of said sleeve member, said spring collector member being further provided with limited axial and limited rotational movement with respect to said sleeve member;

a positioning spring extending axially along and circumferentially over said sleeve member, said positioning spring urging said spring collector member towards said flange of said sleeve member; and a plurality of levers cooperating with said spring collector member providing axial movement of said pressure plate, said pressure plate engaging and disengaging said driven disc.

9. The clutch of claim 8, wherein a thrust ring is disposed between said spring collector member and said flange of said sleeve member.

10. The clutch of claim 8, wherein said plurality of levers are rigid, and a first radial clearance is provided between said levers and said spring collector member, and a second radial clearance is provided between said spring collector member and said sleeve member, said first radial clearance being less than said second radial clearance such that said spring collector member is prevented from contacting said sleeve member.

11. The clutch of claim 9, wherein said plurality of levers are rigid, and a first radial clearance is provided between said levers and said spring collector member, and a second radial clearance is provided between said spring collector member and said thrust ring, said first radial clearance being less than said second radial clearance such that said spring collector member is prevented from contacting said sleeve member.

12. The clutch of claim 9, wherein said thrust ring and said flange of said sleeve member each having a corresponding contact surface, said contact surfaces being curved.

* * * * *

UNITED STATES PATENT AND TRADEMARK OFFICE
CERTIFICATE OF CORRECTION

PATENT NO. : 5,373,927

DATED : December 20, 1994

INVENTOR(S) : Daniel V. Gochenour, Matthew R. Arend, James K. Tarlton, Sr.

It is certified that error appears in the above-identified patent and that said Letters Patent is hereby corrected as shown below:

Column 6, line 20, after "member" insert --such--.

Signed and Sealed this

Fourteenth Day of March, 1995

Attest:

BRUCE LEHMAN

Attesting Officer     Commissioner of Patents and Trademarks